United States Patent [19]  [11] Patent Number: 4,769,210
Campbell  [45] Date of Patent: Sep. 6, 1988

[54] APPARATUS FOR USE IN LIQUID ALKALI ENVIRONMENT

[75] Inventor: Charles S. Campbell, Hale, England

[73] Assignee: United Kingdom Atomic Energy Authority, England

[21] Appl. No.: 45,711

[22] Filed: May 4, 1987

Related U.S. Application Data

[63] Continuation of Ser. No. 792,175, Oct. 28, 1985, abandoned, which is a continuation of Ser. No. 447,893, Dec. 8, 1982, abandoned.

[30] Foreign Application Priority Data

Dec. 18, 1981 [GB] United Kingdom ............... 8138264

[51] Int. Cl.$^4$ .............................. G21C 3/12; B05D 1/08
[52] U.S. Cl. .................................. 376/448; 376/285; 376/900; 376/457; 384/913; 427/423
[58] Field of Search ............... 376/900, 285, 448, 416, 376/417, 457, 303; 252/12; 384/912, 913, 276; 427/423, 34

[56] References Cited

U.S. PATENT DOCUMENTS

| | | | |
|---|---|---|---|
| 2,588,421 | 3/1952 | Shepard | 308/DIG. 8 |
| 2,961,393 | 11/1960 | Monson | 376/303 |
| 2,980,475 | 4/1961 | Wolfe | 308/DIG. 8 |
| 3,055,769 | 9/1962 | Herron et al. | 308/DIG. 8 |
| 3,322,515 | 5/1967 | Dittrich et al. | 149/5 |
| 3,418,028 | 12/1968 | Watson et al. | 308/DIG. 8 |
| 3,481,715 | 12/1969 | Whalen et al. | 427/34 |
| 3,758,124 | 9/1973 | Weinberger et al. | 252/12 |
| 3,853,602 | 12/1974 | Nakamura | 384/912 |
| 3,892,883 | 7/1975 | Le Clercq | 427/34 |
| 3,941,903 | 3/1976 | Tucker, Jr. | 252/12 |
| 3,976,809 | 8/1976 | Dowell | 427/34 |
| 4,027,367 | 6/1977 | Rondeau | 427/423 |
| 4,142,934 | 3/1979 | Wild | 376/448 |
| 4,145,481 | 3/1979 | Gupta et al. | 427/423 |
| 4,162,813 | 7/1979 | Mashburn et al. | 308/DIG. 8 |
| 4,173,685 | 11/1979 | Weatherly | 427/423 |
| 4,190,442 | 2/1980 | Patel | 427/423 |
| 4,294,659 | 10/1981 | Campbell | 165/133 |
| 4,301,213 | 11/1981 | Davies | 308/DIG. 8 |
| 4,306,938 | 12/1981 | Yamanaka | 376/448 |
| 4,314,880 | 2/1982 | McGuire et al. | 376/416 |
| 4,348,434 | 9/1982 | Kammer et al. | 427/423 |
| 4,362,696 | 12/1982 | Brehm, Jr. et al. | 376/417 |

FOREIGN PATENT DOCUMENTS 52-41440 10/1977 Japan ................................. 376/448

Primary Examiner—Harvey E. Behrend
Attorney, Agent, or Firm—Larson and Taylor

[57] ABSTRACT

Apparatus such as a nuclear fuel sub-assembly for use in a liquid alkali metal environment has bearing surfaces (4) coated with alumina or aluminide particles to reduce wear, fretting and friction. The particles are deposited by plasma or detonation gun using a nickel chromium alloy as a metallic bond.

3 Claims, 1 Drawing Sheet

APPARATUS FOR USE IN LIQUID ALKALI ENVIRONMENT

This application is a continuation, of application Ser. No. 792,175 filed Oct. 28, 1985, now abandoned, which is a continuation of application Ser. No. 447,893, filed Dec. 8, 1982, now abandoned.

BACKGROUND OF THE INVENTION

This invention relates to apparatus for use in a liquid alkali metal environment.

The use of liquid alkali metal such as sodium in industry is now quite common. For example, in the nuclear reactor industry liquid sodium is used as a vehicle to convey heat energy from a nuclear reactor core to heat exchange apparatus wherein steam is generated and superheated. Because of the hostile nature of sodium, particularly when operating in the temperature range of 500°–600° C., wear, fretting and high coefficients of friction between bearing surfaces present a serious problem. For example, where alloy steel components make bearing contact with complementary bearing surfaces there is a tendency for transfer of the alloy steel to the complementary bearing surface. Several materials have been used or suggested for the complementary bearing surfaces, for example, stabilised 2¼Cr 1 Mo stainless steel, nickel base alloys such as Inconel 718 (Inconel is a registered Trade Mark), stellite and chromium carbide but none of these bearing surface materials is totally satisfactory when used with alloy steel.

U.S. patent Ser. No. 4,294,659 discloses apparatus wherein one bearing surface is of alloy steel and the complementary bearing surface of a nickel base alloy component is aluminised. With such apparatus wear of the surfaces is considerably reduced when compared with that in previously known apparatus; the wear tracks remain relatively smooth and the coefficient of friction is relatively low. It is believed that the exceptionally good behaviour of these materials is brought about by the relatively easy formation of sodium aluminate by reaction with the oxygen containing sodium; the sodium aluminate serves as a lubricant. However, the process of aluminising the bearing surfaces, that is, the diffusing of aluminium into the surfaces, is a high temperature one and such high temperatures can be harmful to the treated component.

FEATURES AND ASPECTS OF THE INVENTION

According to the present invention in apparatus for use in a liquid alkali metal environment comprising components of alloy steel having complementary bearing or rubbing surfaces, at least one of the components has a bearing surface which is deposition coated with alumina or an aluminide. The alkali metal has a similar effect on the alumina or aluminide coating as it does on an aluminised coating, in use of the apparatus there being reduced wear of the surfaces, reduced fretting and lower coefficients of friction than with conventional apparatus. It is again believed that where the alkali metal is sodium, the exceptionally good behaviour of these materials is brought about by the relatively easy formation of sodium aluminate by reaction with the oxygen containing sodium, the sodium aluminate serving as a lubricant.

By deposition coating is meant the placing of a layer of material on the bearing or rubbing surface rather than diffusing it into the surface. Such a deposition coating can be applied by processes which do not involve raising the component to unacceptably high temperatures whereby its efficiency would be impaired, for example, by plasma or detonation gun.

In a preferred apparatus according to the invention the complementary bearing surface is coated with nickel aluminide in combination with a metallic bond of nickel chromium alloy such as Nichrome (Registered Trade Mark) 15–20V/O. In principle aluminide particles react with the bond to form an aluminium containing nickel base alloy bonding particles of hypostoichiometric aluminide, typically NiAl.

The invention finds one application in apparatus for use as a fuel sub-assembly for a liquid metal cooled nuclear reactor and comprising a tubular wrapper housing a bundle of fuel pins, the wrapper having external abutment surfaces for abutment with adjacent sub-assemblies and wherein the abutment surfaces are deposition coated with alumina or aluminide.

DESCRIPTION OF THE DRAWINGS

An apparatus embodying the invention is described by way of example with reference to the accompanying drawings wherein.

DESCRIPTION OF THE PREFERRED EMBODIMENTS

Figure 1:
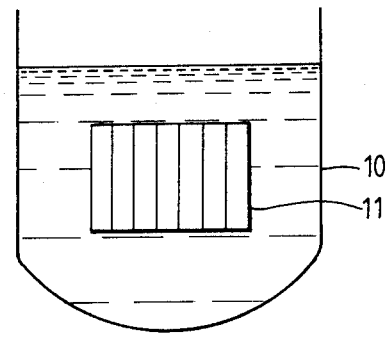
FIG. 1 is a schematic representation of a liquid sodium cooled nuclear reactor which embodies features of the present invention.

FIG. 1 illustrates schematically a liquid sodium cooled nuclear reactor 10 including therein a core 11.

The fuel sub-assembly shown vertically disposed in FIG. 1 comprises a bundle of spaced slender fuel pins (not shown) enclosed in a tubular alloy steel wrapper 2 of hexagonal cross section. The wrapper has an upper neutron shield section 2 and a lower spiked section 3 whereby it can be plugged into a socket in a reactor fuel assembly support structure to stand upright side-by-side with neighbouring sub-assemblies of the reactor fuel assembly. Intermediate the ends the wrapper carries a pad 4 on each side whereby in use in a nuclear reactor fuel assembly the pads of neighbouring fuel sub-assemblies abut each other. The abutting pads accurately space the sub-assemblies apart and, with circumferential restraint means for the fuel assembly, provide bracings whereby bowing due to irradiation void swelling and creep is considerably reduced. The pads are formed in the wrapper by radially outward pressings but in an alternative construction discrete pads of alloy steel are attached as by welding to the wrapper. To reduce wear due to fretting the surfaces of the pads 4 are deposition coated with nickel aluminide.

Other envisaged uses of the invention are in heat exchange apparatus wherein the complementary bearing surfaces are those of the heat exchange tubes and their bracing supports and in nuclear reactor fuel sub-assemblies wherein the complementary bearing surfaces are those of the stainless steel clad fuel pins and their cellular bracing grids.

Figure 2:
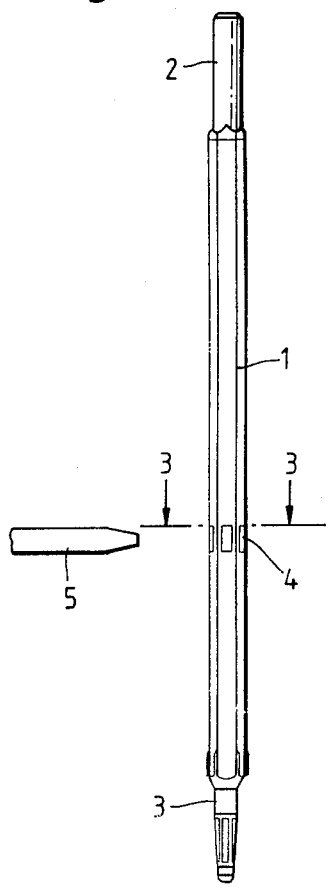
FIG. 2 is a side view of a fuel sub-assembly for a liquid metal cooled fast breeder nuclear reactor.
Figure 3:
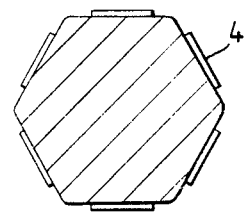
FIG. 3 is a cross-sectional view taken along line 3—3 of FIG. 2.

In FIG. 2, element 5 represents the means for applying the deposition coating, which may be for example by plasma or detonation gun.

I claim:

1. Liquid sodium cooled nuclear reactor core comprising a plurality of core sub-assemblies, each including an alloy steel tubular wrapper immersed in the liquid sodium, each of said wrappers having outwardly projecting abutment pads, said pads being so positioned on the wrappers that at least one pad of a wrapper abuts a pad of an adjacent wrapper to provide pairs of pads in bearing contact, at least one pad of each such pair of pads having a bearing surface consisting essentially of a deposition coating of the combination of nickel aluminide particles and a nickel-chrome particle-bonding alloy, which coating has been formed by the process of depositing the said nickel aluminide particles in combination with the said nickel-chrome particle-bonding alloy to form an aluminum containing layer for exposure to the liquid sodium.

2. Liquid sodium cooled nuclear reactor core as claimed in claim 1, wherein the process of deposition is by plasma.

3. Liquid sodium cooled nuclear reactor core as claimed in claim 1, wherein the process of deposition is by a detonation gun.

* * * * *